US010947864B2

(12) United States Patent
Allebrod et al.

(10) Patent No.: US 10,947,864 B2
(45) Date of Patent: Mar. 16, 2021

(54) GAS TURBINE WITH SEPARATE COOLING FOR TURBINE AND EXHAUST CASING

(71) Applicant: Siemens Aktiengesellschaft, Munich (DE)

(72) Inventors: Dirk Allebrod, Oberhausen (DE); Stephan Sonnen, Essen (DE)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 107 days.

(21) Appl. No.: 16/315,750

(22) PCT Filed: Jul. 28, 2017

(86) PCT No.: PCT/EP2017/069131
§ 371 (c)(1),
(2) Date: Jan. 7, 2019

(87) PCT Pub. No.: WO2018/046178
PCT Pub. Date: Mar. 15, 2018

(65) Prior Publication Data
US 2019/0186294 A1     Jun. 20, 2019

(30) Foreign Application Priority Data
Sep. 12, 2016    (DE) ..................... 10 2016 217 320.0

(51) Int. Cl.
*F01D 11/24*      (2006.01)
*F01D 11/02*      (2006.01)
(Continued)

(52) U.S. Cl.
CPC ............. *F01D 25/26* (2013.01); *F01D 9/065* (2013.01); *F01D 11/025* (2013.01); *F01D 11/18* (2013.01);
(Continued)

(58) Field of Classification Search
CPC ........ F01D 25/26; F01D 25/14; F01D 25/162; F01D 11/025; F01D 11/18; F01D 25/16; F01D 9/065; F01D 25/24
See application file for complete search history.

(56) References Cited

U.S. PATENT DOCUMENTS 2,110,679 A *   3/1938   Robinson ................ F01D 5/141
                                                     416/189
2,622,790 A *   12/1952   McLeod ................. F01D 9/042
                                                     415/209.1
(Continued)

FOREIGN PATENT DOCUMENTS

EP         2497907 A2 *   9/2012  ............ F01D 25/12
EP         2497907 A2     9/2012
(Continued)

OTHER PUBLICATIONS

PCT International Search Report and Written Opinion of International Searching Authority dated Oct. 16, 2017 corresponding to PCT International Application No. PCT/EP2017/069131 filed Jul. 28, 2017.

*Primary Examiner* — Ninh H. Nguyen
*Assistant Examiner* — Brian Christopher Delrue

(57) ABSTRACT

A gas turbine having a turbine casing, an outer and inner casing part between which a hot gas flows. An annular duct is formed between the outer casing part and the turbine casing to accommodate a cooling fluid. An exhaust gas casing is positioned downstream in the flow direction of the hot gas. A bearing system for a rotor has bearing struts arranged around the circumference which extend from a shaft bearing to an outer casing and, in the hot gas path of an exhaust gas diffuser arranged in the exhaust gas casing are shielded by another strut set which surrounds the bearing struts and is hollow to support the diffuser, wherein, to center the turbine and the exhaust gas casing, these are connected (Continued)

to one another via a fit wherein the turbine and the exhaust gas casing can be supplied with cooling air independently of one another.

9 Claims, 2 Drawing Sheets

(51) Int. Cl.
*F01D 25/26* (2006.01)
*F01D 25/16* (2006.01)
*F01D 9/06* (2006.01)
*F01D 25/24* (2006.01)
*F02C 7/12* (2006.01)
*F01D 11/18* (2006.01)
*F01D 25/14* (2006.01)
*F01D 25/12* (2006.01)
*F23R 3/06* (2006.01)

(52) U.S. Cl.
CPC .......... *F01D 25/125* (2013.01); *F01D 25/14* (2013.01); *F01D 25/16* (2013.01); *F01D 25/162* (2013.01); *F01D 25/24* (2013.01); *F02C 7/12* (2013.01); *F23R 3/06* (2013.01)

(56) References Cited

U.S. PATENT DOCUMENTS

| | | | | |
|---|---|---|---|---|
| 3,024,969 A * | 3/1962 | Russell | F02C 7/04 | 415/210.1 |
| 3,075,744 A * | 1/1963 | Peterson | F01D 5/189 | 415/115 |
| 3,286,461 A * | 11/1966 | Johnson | F02C 7/27 | 60/787 |
| 3,800,864 A * | 4/1974 | Hauser | F28F 3/022 | 165/47 |
| 3,909,157 A * | 9/1975 | Wachtell | F01D 5/005 | 415/208.3 |
| 3,965,066 A * | 6/1976 | Sterman | F01D 9/023 | 60/800 |
| 4,195,396 A * | 4/1980 | Blazek | B23P 15/04 | 164/122.1 |
| 4,292,008 A * | 9/1981 | Grosjean | F01D 5/186 | 415/115 |
| 4,314,794 A * | 2/1982 | Holden | F01D 5/182 | 416/225 |
| 4,375,891 A * | 3/1983 | Pask | F01D 11/025 | 277/384 |
| 4,376,004 A * | 3/1983 | Bratton | F01D 5/184 | 156/89.27 |
| 4,382,359 A * | 5/1983 | Sampayo | F28D 7/06 | 60/39.511 |
| 4,464,094 A * | 8/1984 | Gerken | B23P 15/006 | 164/122 |
| 4,642,024 A * | 2/1987 | Weidner | F01D 11/08 | 415/116 |
| 4,821,522 A * | 4/1989 | Matthews | F01D 9/023 | 415/175 |
| 4,987,736 A * | 1/1991 | Ciokajlo | F01D 9/065 | 60/797 |
| 4,987,944 A * | 1/1991 | Parks | B22C 9/04 | 164/10 |
| 5,197,856 A * | 3/1993 | Koertge | F01D 25/246 | 415/199.4 |
| 5,332,360 A * | 7/1994 | Correia | F01D 9/042 | 29/889.21 |
| 5,398,496 A * | 3/1995 | Taylor | F23R 3/60 | 60/796 |
| 5,470,198 A * | 11/1995 | Harrogate | F01D 9/023 | 415/115 |
| 5,791,148 A * | 8/1998 | Burrus | F23R 3/346 | 60/752 |
| 6,164,903 A * | 12/2000 | Kouris | F01D 9/04 | 415/135 |
| 6,200,092 B1 * | 3/2001 | Koschier | F01D 5/146 | 415/191 |
| 6,431,824 B2 * | 8/2002 | Schotsch | F01D 9/02 | 415/115 |
| 6,439,841 B1 * | 8/2002 | Bosel | F01D 9/065 | 415/142 |
| 6,763,654 B2 * | 7/2004 | Orlando | F01D 1/24 | 60/226.1 |
| 6,854,738 B2 * | 2/2005 | Matsuda | F23R 3/60 | 277/632 |
| 6,860,716 B2 * | 3/2005 | Czachor | F01D 25/162 | 415/142 |
| 6,884,030 B2 * | 4/2005 | Darkins, Jr. | F01D 9/042 | 29/889.22 |
| 6,988,369 B2 * | 1/2006 | Conete | F23R 3/50 | 60/796 |
| 7,004,720 B2 * | 2/2006 | Synnott | F01D 25/14 | 415/115 |
| 7,114,339 B2 * | 10/2006 | Alvanos | F01D 25/12 | 60/806 |
| 7,114,917 B2 * | 10/2006 | Legg | F01D 9/04 | 415/137 |
| 7,124,572 B2 * | 10/2006 | Aycock | F01D 9/065 | 60/39.511 |
| 7,360,988 B2 * | 4/2008 | Lee | F01D 9/00 | 29/889.22 |
| 7,383,686 B2 * | 6/2008 | Aycock | F01D 9/065 | 60/39.511 |
| 7,452,182 B2 * | 11/2008 | Vance | F01D 5/14 | 415/135 |
| 7,452,184 B2 * | 11/2008 | Durocher | F01D 5/081 | 415/115 |
| 7,527,469 B2 * | 5/2009 | Zborovsky | F01D 9/041 | 277/412 |
| 7,553,126 B2 * | 6/2009 | Charier | F01D 17/14 | 415/128 |
| 7,726,131 B2 * | 6/2010 | Sze | F23R 3/06 | 60/754 |
| 7,836,702 B2 * | 11/2010 | Grivas | F01D 9/042 | 60/796 |
| 7,976,274 B2 * | 7/2011 | Lee | F01D 9/041 | 415/190 |
| 8,177,488 B2 * | 5/2012 | Manteiga | F01D 25/18 | 415/142 |
| 8,371,127 B2 * | 2/2013 | Durocher | F02C 7/18 | 60/806 |
| 8,388,307 B2 * | 3/2013 | Smoke | F01D 9/02 | 415/135 |
| 8,500,392 B2 * | 8/2013 | Durocher | F01D 9/06 | 415/116 |
| 8,783,044 B2 * | 7/2014 | Steiger | F01D 9/023 | 60/806 |
| 8,950,192 B2 * | 2/2015 | Tschuor | F02C 7/28 | 60/800 |
| 9,062,566 B2 * | 6/2015 | Suciu | F02C 7/185 | |
| 9,097,141 B2 * | 8/2015 | Paradis | F01D 25/243 | |
| 9,115,593 B2 * | 8/2015 | Suciu | F01D 15/12 | |
| 9,127,566 B2 * | 9/2015 | Suciu | F01D 9/065 | |
| 9,200,536 B2 * | 12/2015 | McCaffrey | F01D 25/162 | |
| 9,311,445 B2 * | 4/2016 | Nanda | F01D 5/30 | |
| 9,416,662 B2 * | 8/2016 | Morgan | F01D 5/183 | |
| 9,732,628 B2 * | 8/2017 | Cherolis | F01D 9/065 | |
| 9,732,674 B2 * | 8/2017 | Sakamoto | F02C 7/00 | |
| 9,752,447 B2 * | 9/2017 | Clum | F02C 7/18 | |
| 9,777,595 B2 * | 10/2017 | Sheridan | B64C 11/14 | |
| 9,828,914 B2 * | 11/2017 | Suciu | F01D 25/12 | |
| 9,915,171 B2 * | 3/2018 | Winn | F01D 9/065 | |
| 10,060,291 B2 * | 8/2018 | Kumar | F02C 3/04 | |
| 10,087,847 B2 * | 10/2018 | Szymanski | F01D 25/162 | |
| 10,364,691 B2 * | 7/2019 | Curlier | F01D 15/10 | |
| 10,450,881 B2 * | 10/2019 | Mugglestone | F01D 25/12 | |
| 2005/0056020 A1 * | 3/2005 | Hadder | F23R 3/005 | 60/752 |

(56) References Cited

U.S. PATENT DOCUMENTS

| | | | | |
|---|---|---|---|---|
| 2005/0254942 | A1* | 11/2005 | Morrison | C04B 37/005 415/200 |
| 2006/0010852 | A1* | 1/2006 | Gekht | F02K 1/386 60/262 |
| 2006/0123796 | A1* | 6/2006 | Aycock | F02C 7/18 60/782 |
| 2007/0140845 | A1* | 6/2007 | Marke | F01D 9/06 415/232 |
| 2008/0199661 | A1* | 8/2008 | Keller | B32B 3/08 428/188 |
| 2008/0307795 | A1* | 12/2008 | Bader | F02C 7/20 60/797 |
| 2010/0132371 | A1* | 6/2010 | Durocher | F01D 25/28 60/796 |
| 2010/0132372 | A1* | 6/2010 | Durocher | F01D 25/243 60/796 |
| 2010/0132374 | A1* | 6/2010 | Manteiga | F01D 9/02 60/796 |
| 2010/0132376 | A1* | 6/2010 | Durocher | F01D 25/162 60/797 |
| 2010/0135770 | A1* | 6/2010 | Durocher | F01D 25/28 415/69 |
| 2010/0275572 | A1* | 11/2010 | Durocher | F01D 25/18 60/39.08 |
| 2010/0275614 | A1* | 11/2010 | Fontaine | F01D 25/162 60/797 |
| 2011/0005234 | A1* | 1/2011 | Hashimoto | F01D 25/30 60/796 |
| 2011/0081237 | A1* | 4/2011 | Durocher | F01D 25/12 415/173.1 |
| 2011/0252808 | A1* | 10/2011 | McKenney | F01D 25/28 60/796 |
| 2012/0297791 | A1* | 11/2012 | Suciu | F02K 1/04 60/796 |
| 2013/0111906 | A1* | 5/2013 | Bouchard | F02C 7/24 60/694 |
| 2013/0224011 | A1 | 8/2013 | Hashimoto | |
| 2013/0259639 | A1* | 10/2013 | Suciu | F01D 15/12 415/1 |
| 2013/0259670 | A1* | 10/2013 | Sakamoto | F02C 7/00 415/207 |
| 2014/0013771 | A1* | 1/2014 | Farah | F02C 7/20 60/797 |
| 2014/0142898 | A1* | 5/2014 | Nanda | F01D 25/30 703/1 |
| 2014/0205447 | A1* | 7/2014 | Patat | F02C 6/08 415/177 |
| 2014/0248152 | A1* | 9/2014 | Chuong | F01D 25/246 416/95 |
| 2014/0338336 | A1* | 11/2014 | Cunha | F01D 9/023 60/737 |
| 2015/0007580 | A1* | 1/2015 | Bellabal | F01D 25/24 60/797 |
| 2015/0059357 | A1* | 3/2015 | Morgan | F01D 5/183 60/806 |
| 2015/0143815 | A1* | 5/2015 | Salunkhe | F01D 25/30 60/796 |
| 2015/0143816 | A1* | 5/2015 | Salunkhe | F01D 25/162 60/796 |
| 2015/0308343 | A1* | 10/2015 | Scott | F01D 25/24 60/796 |
| 2015/0315925 | A1* | 11/2015 | Budnick | F01D 25/162 415/214.1 |
| 2015/0345400 | A1* | 12/2015 | Scott | F01D 25/162 60/796 |
| 2016/0230576 | A1* | 8/2016 | Freeman | F01D 9/041 |
| 2016/0281721 | A1* | 9/2016 | Army, Jr. | F16C 37/00 |
| 2016/0290147 | A1* | 10/2016 | Weaver | F01D 25/005 |
| 2016/0298540 | A1* | 10/2016 | Suciu | B64C 11/14 |
| 2016/0298544 | A1* | 10/2016 | Suciu | F01D 25/02 |
| 2016/0348911 | A1* | 12/2016 | Polyzopoulos | F23R 3/36 |

FOREIGN PATENT DOCUMENTS

| | | | | |
|---|---|---|---|---|
| EP | 2573329 | A2 * | 3/2013 | ........... F01D 25/125 |
| EP | 2573329 | A2 | 3/2013 | |
| EP | 2584152 | A2 * | 4/2013 | ........... F01D 25/162 |
| EP | 3009601 | A1 * | 4/2016 | ........... F01D 25/246 |
| WO | 2015191039 | A1 | 12/2015 | |
| WO | WO-2015191039 | A1 * | 12/2015 | ............... F01D 9/04 |

* cited by examiner

GAS TURBINE WITH SEPARATE COOLING FOR TURBINE AND EXHAUST CASING

CROSS REFERENCE TO RELATED APPLICATIONS

This application is the US National Stage of International Application No. PCT/EP2017/069131 filed Jul. 28, 2017, and claims the benefit thereof. The International Application claims the benefit of German Application No. DE 10 2016 217 320.0 filed Sep. 12, 2016. All of the applications are incorporated by reference herein in their entirety.

FIELD OF INVENTION

The invention relates to a gas turbine having a turbine housing and an exhaust gas housing, which can be supplied with cooling air separately from each other, and a method for operating a gas turbine.

BACKGROUND OF INVENTION

Within an exhaust gas housing of a gas turbine there are typically arranged a bearing housing and an inner and an outer cone of an exhaust gas diffuser, which are all connected to each other by means of a system comprising struts which, for example, comprises six bearing struts which are arranged in a uniform manner in the periphery. The bearing struts extend in this instance radially outward from the bearing housing through the exhaust gas diffuser to the outer housing of the exhaust gas housing. In the hot gas path of the exhaust gas diffuser the bearing struts are shielded by an additional strut set which surrounds them and which is constructed in a hollow manner and which acts as a support for the exhaust gas diffuser so that the bearing struts are protected from the hot gas and can be cooled by means of air flowing through the hollow space. The strut system thereby also becomes less sensitive with respect to temperature transients. A system of this type is disclosed in US 2014/205447 A1, wherein a corresponding cooling of the components is carried out and the components can therefore be produced from more cost-effective material. Furthermore, a similar temperature distribution over component boundaries is produced as a result of guiding the cooling air from one component into another.

In order to cool the exhaust gas housing, cooling air is directed according to the prior art through the outer housing of the turbine, where the cooling air, before it flows into the exhaust gas housing, is already used for thermal conditioning, that is to say, to cool the components which delimit the hot gas path in the turbine. Via corresponding hollow spaces, the cooling air is directed from the outer housing of the turbine to the connection flange with the exhaust gas housing and there supplied through openings to the upper sides of the bearing struts.

A centering seat at the interface of the outer housing of the turbine and the exhaust gas housing ensures a precise central positioning of the bearing and consequently of the rotor in the machine.

If both housings, that is to say, turbine and exhaust gas housing, expand differently, when the gas turbine is started up or shut down, this fit is released and consequently the bearing housing drops down.

Furthermore, with comparatively large gas turbines, with regard to the transportability, in particular with regard to reliable external dimensions in the region of the direction of cooling air from the outer housing of the turbine to the exhaust gas housing, space problems may occur so that a required flow cross-section for the channel which transports the cooling air cannot be provided or, vice versa, permitted maximum dimensions for a transport operation are exceeded.

SUMMARY OF INVENTION

An object of the invention is to provide a gas turbine which enables improved cooling of the exhaust gas housing with a small spatial requirement. Another object of the invention is to provide a corresponding method for operation.

The invention solves the problem relating to a gas turbine in that there is provided a gas turbine having a turbine, comprising a turbine housing, for an outer and an inner housing portion, between which a hot gas flows during operation of the gas turbine, wherein there is formed between the outer housing portion and the turbine housing at least partially an annular channel which is constructed to receive a cooling fluid, and having an exhaust gas housing which is arranged downstream of the turbine in the flow direction of a hot gas and which has a bearing system for a rotor, comprising bearing struts which are arranged over the periphery and which extend from a shaft bearing to an outer housing and which are shielded in the hot gas path of an exhaust gas diffuser which is arranged in the exhaust gas housing by an additional strut set which surrounds the bearing struts and which is constructed in a hollow manner and which acts as a support for the diffuser so that the bearing struts are protected from the hot gas and can be cooled by means of air flowing through the hollow space, wherein in order to center the turbine and exhaust gas housing they are connected to each other by means of a fit, the turbine and the exhaust gas housing can be supplied with cooling air independently of each other, whereby the quantities of cooling air for the turbine and exhaust gas housing and the temperatures which can be reached at that location in each case can be adjusted separately. This leads not only to an optimization, or reduction, of the cooling air requirement, but also enables a selective temperature control of the turbine and exhaust gas housing.

In an advantageous embodiment of the invention, the annular channel is separated from the exhaust gas housing in a fluid-tight manner in the peripheral direction by means of a partition. In the prior art, both regions were still connected to each other in technical fluid terms. According to the invention, such a connection is not only unnecessary but also undesirable.

In this instance, it is advantageous for the partition to be constructed as a partition sheet. Partition sheets are typically also referred to as bulkhead plates. Since in the region of the turbine and exhaust gas housing there are no significant pressure differences, the partitions may be constructed to have relatively thin walls. This enables the use of simpler and more cost-effective components.

According to an advantageous development, there may also be provision for the bearing struts to comprise upper sides to which the coolant can be directly supplied. This is advantageous since the upper sides are located radially at the outer side and can be reached in a simple manner, that is to say, the coolant supply can be implemented readily in a radial outer region of the exhaust gas housing. Furthermore, it is advantageous for each of the bearing struts to have a cooling hollow space which is arranged in the respective bearing strut for guiding a coolant from the radially outer side to the radially inner side in the exhaust gas housing. In such a case, the cooling air can be directed directly through the bearing strut from the radially outer side to the radially inner side so that the coolant, that is to say, the cooling air, can be rapidly distributed in the exhaust gas housing.

In this context, it is particularly advantageous for the cooling hollow spaces to terminate in the region of the shaft bearing so that this bearing can also be reliably cooled.

According to a particular embodiment, the gas turbine further comprises a device for controlling a central positioning of the turbine and exhaust gas housing by means of coolant quantities which are supplied in each case. This control establishes temperatures and positions at different locations of the turbine and the exhaust gas housing and adjusts the respective air supply in such a manner that the thermal behavior of the components is compensated for and a release of the fit between the turbine and exhaust gas housing is prevented.

The problem which involves a method is solved by a method for operating a gas turbine having a turbine and an exhaust gas housing, in which coolant is supplied separately to the turbine and the exhaust gas housing. In particular, the turbine and the exhaust gas housing are centered by coolant being supplied to them in a controlled manner. In this instance, coolant is advantageously supplied in such a manner that a different thermal expansion of the turbine and exhaust gas housing is prevented so that a precise central positioning in a fit at an interface of the turbine and the exhaust gas housing is ensured.

With the gas turbine according to the invention and the inventive method, according to which a coolant is supplied separately to the turbine and the exhaust gas housing, the cooling of the housings via the coolant quantities can be controlled better than before.

Furthermore, the coolant supply can be carried out in a simpler manner and in particular with a smaller spatial requirement than with the cooling known from the prior art in which the coolant was directed onward from the turbine into the exhaust gas housing. With large gas turbines, this means that now the requirements with respect to the maximum dimensions for a transport operation can also be complied with.

A control of the cooling or a direct influence on the housing temperatures of the turbine and exhaust gas housing enables a reliable centering seat on the interface of the housings so that a rotor offset during operation of the gas turbine is reduced.

BRIEF DESCRIPTION OF THE DRAWINGS

The invention is explained in greater detail by way of example with reference to the drawings. In the schematic drawings which are not drawn to scale.

DETAILED DESCRIPTION OF INVENTION

Figure 1:
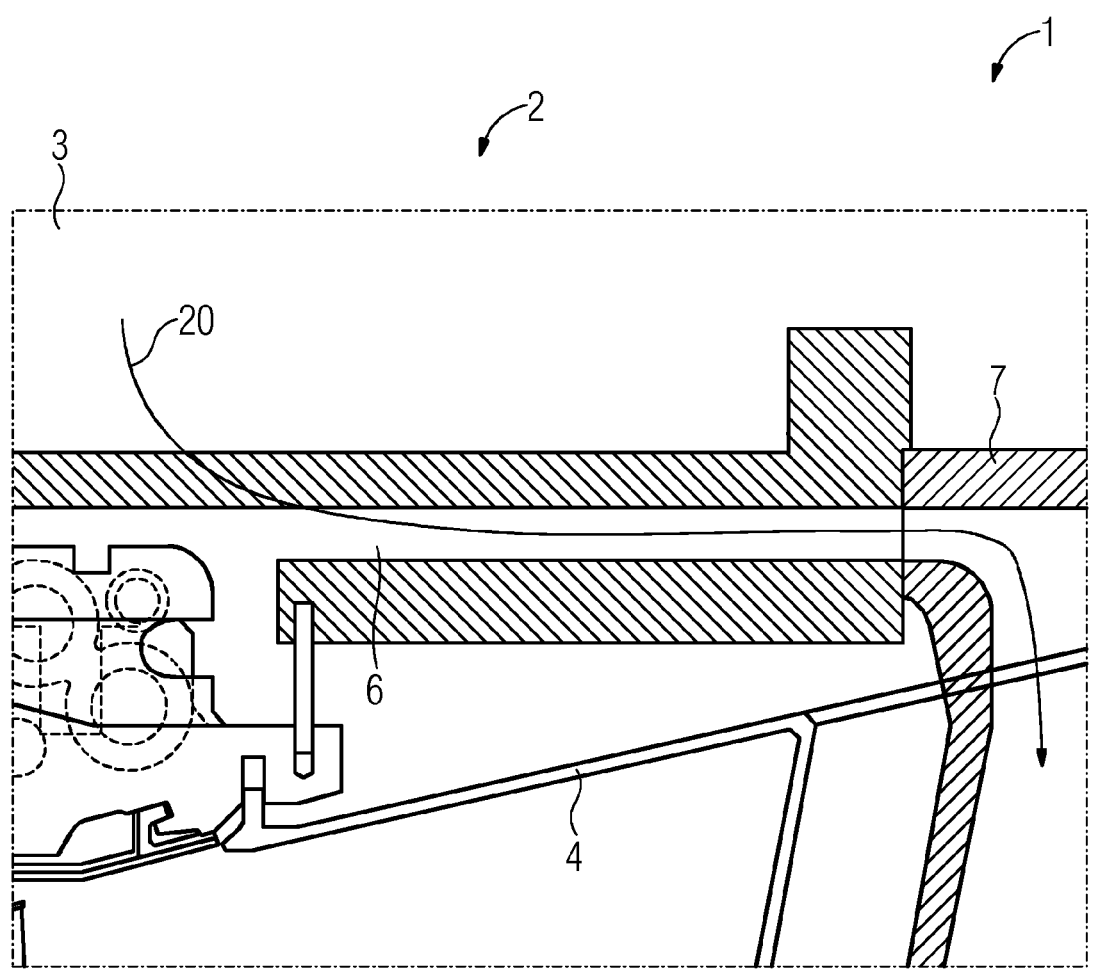
FIG. 1 is a cut-out of a gas turbine having a common cooling air supply of the turbine and exhaust gas housing according to the prior art.

FIG. 1 shows schematically and by way of example a cut-out of a gas turbine 1, in particular the transition between a turbine 2 and exhaust gas housing 7. According to the prior art shown in FIG. 1, the cooling air supply of the turbine 2 and exhaust gas housing 7 is carried out via a common air flow 20 which first flows through the annular channel 6 of the turbine 2, which annular channel is at least partially formed by a turbine housing 3 and an outer housing portion 4, before it can flow into the exhaust gas housing 7. Such a construction requires a comparatively large amount of space and allows no influence on individual components, such as the turbine 2 and exhaust gas housing 7.

Figure 2:
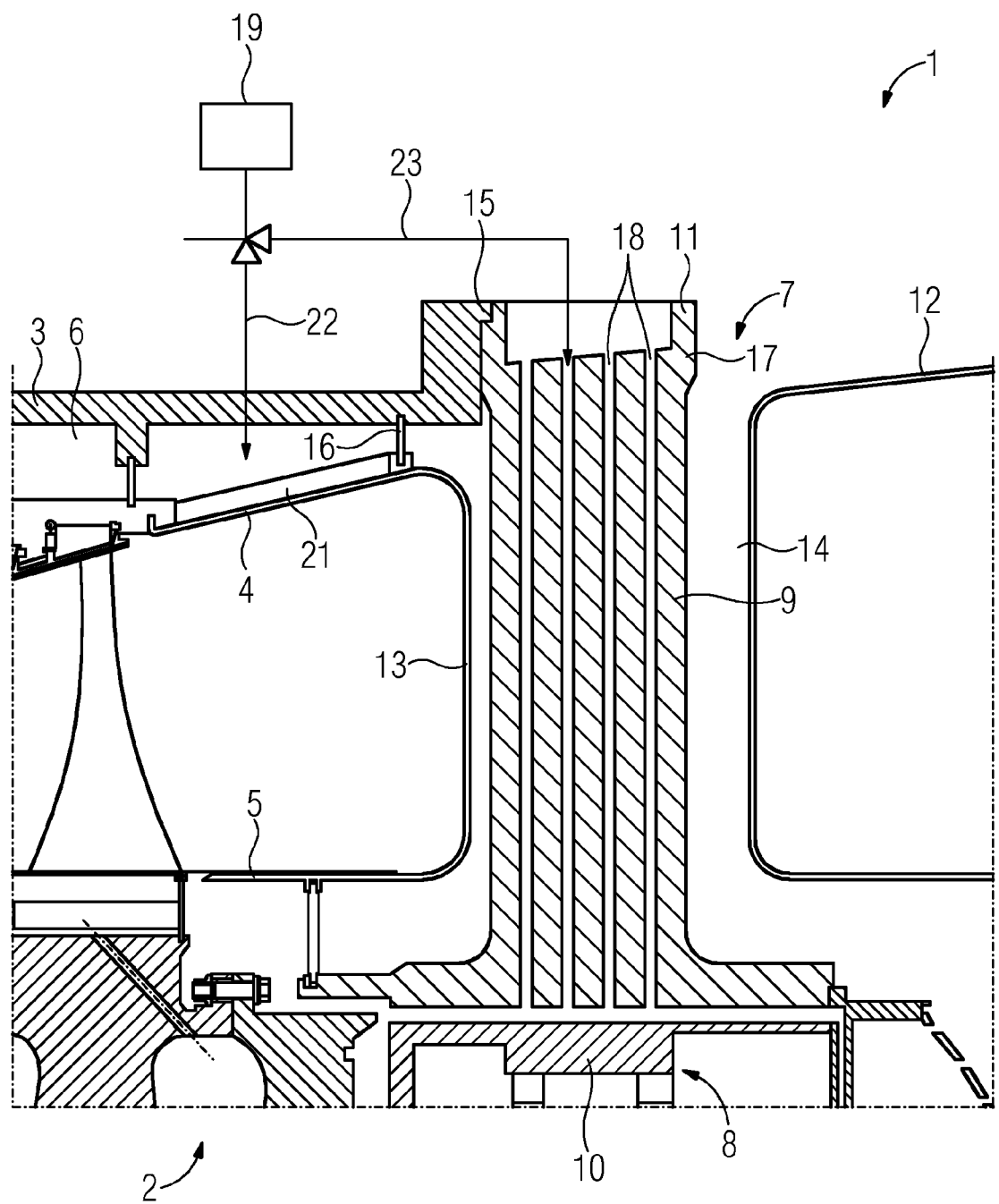
FIG. 2 is a cut-out of a gas turbine having a separate cooling air supply of the turbine and exhaust gas housing according to the invention.

FIG. 2 shows a separate cooling air supply of the turbine 2 and exhaust gas housing 7 according to the invention. The cut-out of FIG. 2 is selected to be slightly larger than in FIG. 1 and further shows in the region of the turbine 2 an inner housing portion 5 which together with the outer housing portion 4 surrounds the hot gas path of the turbine 2 and the bearing system 8 for a rotor, comprising bearing struts 9 which are arranged over the periphery and which extend from a shaft bearing 10 to an outer housing 11. These components are shielded in the hot gas path of an exhaust gas diffuser which is arranged in the exhaust gas housing 7 by an additional strut set 13 which surrounds the bearing struts 9 and which is constructed in a hollow manner and which acts as a support for the diffuser 12 so that the bearing struts 9 are protected from the hot gas and can be cooled by means of air flowing through the hollow space 14.

In order to center the turbine 2 and exhaust gas housing 7, these are connected to each other by means of a fit 15.

According to the invention, the turbine 2 and exhaust gas housing 7 are acted on separately with cooling air.

A first cooling air flow 22 supplies the annular channel 6 in the region of the turbine 2 and protects the turbine housing 3 from high temperatures from the exhaust gas flow.

A second cooling air flow 23 cools the upper sides 17 of the bearing strut 9 and the bearing system 8 via cooling hollow spaces 18.

As a result of the separation of the cooling air supply, the turbine 2 has between the turbine housing 3 and outer housing portion 4 a partition 16 in order to separate the regions which are intended to be cooled from each other in technical fluid terms.

Furthermore, the outer housing portion 4 may have a thermal insulation 21 so that the quantity of coolant in the region of the turbine 2 can be further reduced.

FIG. 2 further shows a device 19 for controlling the first and second cooling air flows 22, 23.

As a result of the division and possible controlled supply of the components with cooling air, the thermal behavior of the components can be compensated for and a release of the fit 15 can be prevented.

The invention claimed is:

1. A gas turbine comprising:
a turbine, comprising a turbine housing, an outer housing portion and an inner housing portion between which a hot gas flows during operation of the gas turbine;
an annular channel formed at least partially between the outer housing portion and the turbine housing, which is constructed to receive a cooling fluid; and
an exhaust gas housing which is arranged downstream of the turbine in a flow direction of a hot gas and which comprises a bearing system for a rotor, the bearing system comprising bearing struts which are arranged over a periphery and which extend from a shaft bearing to an outer housing and which are shielded in a hot gas path of an exhaust gas diffuser which is arranged in the exhaust gas housing by an additional strut set which surrounds the bearing struts and which is constructed in a hollow manner and which acts as a support for the exhaust gas diffuser so that the bearing struts disposed in a hollow space therein are protected from the hot gas and are cooled by air flowing through the hollow space;

wherein, in order to center the turbine and the exhaust gas housing, the turbine and the exhaust gas housing are connected to each other by a fit, wherein the turbine and the exhaust gas housing are supplied with the cooling fluid independently of each other, and wherein quantities of cooling fluid for the annular channel and for the exhaust gas housing, and resulting respective temperatures, are separately adjustable.

2. The gas turbine as claimed in claim 1,
wherein the annular channel is separated from the exhaust gas housing in a fluid-tight manner in a peripheral direction by a partition.

3. The gas turbine as claimed in claim 2,
wherein the partition is constructed as a partition sheet.

4. The gas turbine as claimed in claim 1,
wherein the bearing struts comprise upper sides and a coolant can be supplied to the upper sides of the bearing struts.

5. The gas turbine as claimed in claim 1,
wherein each of the bearing struts comprises a cooling hollow space which is arranged in the respective bearing strut for guiding a coolant from a radially outer side to a radially inner side.

6. The gas turbine as claimed in claim 5,
wherein the cooling hollow spaces terminate in a region of the shaft bearing.

7. A method for operating a gas turbine as claimed in claim 1, the method comprising:
supplying the cooling fluid separately to the turbine and to the exhaust gas housing; and
separately adjusting quantities of the cooling fluid for the annular channel and for the exhaust gas housing and the resulting respective temperatures.

8. The method as claimed in claim 7,
wherein the turbine housing and the exhaust gas housing are centered by the cooling fluid being supplied to the annular channel and the exhaust gas housing in a controlled manner.

9. The method as claimed in claim 7,
wherein the cooling fluid is supplied in such a manner that a different thermal expansion of the turbine housing and the exhaust gas housing is prevented so that a precise central positioning in the fit at an interface of the turbine housing and the exhaust gas housing is ensured.

* * * * *